United States Patent
Panday et al.

(10) Patent No.: US 8,395,071 B2
(45) Date of Patent: Mar. 12, 2013

(54) FEEDING LUBRICANT FOR CORED WELDING ELECTRODE

(75) Inventors: Radhika Panday, Mayfield Village, OH (US); Vaidyanath Rajan, Mentor, OH (US); Jean Victoria Reid, Toronto (CA); Campbell Ian Sidders, Mississauga (CA)

(73) Assignee: Lincoln Global, Inc., Cleveland, OH (US)

( * ) Notice: Subject to any disclaimer, the term of this patent is extended or adjusted under 35 U.S.C. 154(b) by 182 days.

(21) Appl. No.: 12/753,135

(22) Filed: Apr. 2, 2010

(65) Prior Publication Data

US 2011/0240604 A1    Oct. 6, 2011

(51) Int. Cl.
*B23K 9/16* (2006.01)
*B23K 35/36* (2006.01)
*B23K 35/02* (2006.01)

(52) U.S. Cl. .................. 219/74; 219/137.2; 219/145.22

(58) Field of Classification Search .................... 219/74, 219/137.2, 145.22
See application file for complete search history.

(56) References Cited

U.S. PATENT DOCUMENTS

| | | | |
|---|---|---|---|
| 1,525,840 A | 2/1925 | Weed | |
| 1,722,929 A | 7/1929 | Lincoln | |
| 2,785,285 A | 3/1957 | Bernard | |
| 2,944,142 A | 7/1960 | Sjoman | |
| 2,956,017 A | 10/1960 | Franks | |
| 3,534,390 A | 10/1970 | Woods et al. | |
| 3,947,655 A | 3/1976 | Gonzalez et al. | |
| 4,286,293 A | 8/1981 | Jablonowski | |
| 4,305,197 A | 12/1981 | Puschner et al. | |
| 4,551,610 A | 11/1985 | Amata | |
| 4,629,110 A | 12/1986 | Holmgren et al. | |
| 4,717,536 A | 1/1988 | Chai et al. | |
| 4,723,061 A | 2/1988 | Munz et al. | |
| 4,800,131 A | 1/1989 | Marshall et al. | |
| 4,833,296 A | 5/1989 | Crockett et al. | |
| 5,003,155 A | 3/1991 | Chai et al. | |
| 5,015,823 A | 5/1991 | Crockett et al. | |
| 5,055,655 A | 10/1991 | Chai et al. | |
| 5,118,919 A | 6/1992 | Chai et al. | |
| 5,120,931 A | 6/1992 | Kotecki et al. | |
| 5,233,160 A | 8/1993 | Gordish et al. | |
| 5,365,036 A | 11/1994 | Crockett et al. | |

(Continued)

FOREIGN PATENT DOCUMENTS

| | | |
|---|---|---|
| EP | 1724052 | 11/2006 |
| JP | 57-193299 | 11/1982 |

(Continued)

OTHER PUBLICATIONS

International Search Report from PCT/IB11/000724 dated Apr. 4, 2011.

(Continued)

*Primary Examiner* — Luan C Thai
(74) *Attorney, Agent, or Firm* — Calfee, Halter & Griswold LLP

(57) ABSTRACT

A feeding lubricant for use on a welding electrode comprises about 10 to 40 wt. % of at least one soap-based lubricant, about 40 to 90 wt. % of at least one solid particulate lubricant selected from $MoS_2$, $WS_2$, ZnO, graphite and PTFE and up to 20 wt. % of at least one optional additional particulate lubricant ingredient.

28 Claims, 5 Drawing Sheets

U.S. PATENT DOCUMENTS

| | | |
|---|---|---|
| 5,369,244 A | 11/1994 | Kulikowski et al. |
| 5,593,956 A | 1/1997 | Gzesh |
| 5,821,500 A | 10/1998 | Araki et al. |
| 5,898,022 A | 4/1999 | Maples |
| 5,973,291 A | 10/1999 | Kramer et al. |
| 6,079,243 A | 6/2000 | Inoue et al. |
| 6,103,997 A | 8/2000 | Pan |
| 6,337,144 B1 | 1/2002 | Shimizu et al. |
| 6,339,209 B1 | 1/2002 | Kotecki |
| 6,365,864 B1 | 4/2002 | Stava |
| 6,674,047 B1 | 1/2004 | Hughes et al. |
| 6,750,430 B2 | 6/2004 | Kelly |
| 6,855,913 B2 | 2/2005 | Nikodym |
| 7,485,829 B2 * | 2/2009 | Konishi et al. ............. 219/145.1 |
| 2005/0044687 A1 | 3/2005 | Matsuguchi et al. |
| 2005/0045699 A1 | 3/2005 | Klonishi et al. |
| 2005/0077277 A1 | 4/2005 | Kim et al. |
| 2006/0255027 A1 | 11/2006 | Katiyar |
| 2009/0314756 A1 | 12/2009 | Schaeffer et al. |

FOREIGN PATENT DOCUMENTS

| | | |
|---|---|---|
| JP | 2-284792 | 11/1990 |
| JP | 6-285677 | 10/1994 |
| JP | 8-057650 | 3/1996 |
| JP | 8-151548 | 6/1996 |
| JP | 8-157858 | 6/1996 |
| JP | 8-257788 | 10/1996 |
| JP | 9-141589 | 6/1997 |
| JP | 9-206987 | 8/1997 |
| JP | 9-323191 | 12/1997 |
| JP | 10-193175 | 7/1998 |
| JP | 2002-219595 | 8/2002 |
| JP | 2002-239779 | 8/2002 |
| JP | 2003-039191 | 2/2003 |
| JP | 2003-305587 | 10/2003 |
| JP | 2004-034131 | 2/2004 |
| JP | 2004-202572 | 7/2004 |
| JP | 2005-074438 | 3/2005 |
| JP | 2005-095972 | 4/2005 |
| JP | 2006-095551 | 4/2006 |
| JP | 2006-095579 | 4/2006 |

OTHER PUBLICATIONS

Harwig et al., "Effects of Welding Parameters and Electrode Atmospheric Exposure on the Diffusible Hydrogen Content of Gas Shielded Flux Cored Arc Welds", Welding Research Supplement, pp. 314s-321s, Sep. 1999.

* cited by examiner

US 8,395,071 B2

FEEDING LUBRICANT FOR CORED WELDING ELECTRODE

BACKGROUND

Gas metal arc welding (GMAW), sometimes referred to by its subtypes metal inert gas (MIG) welding or metal active gas (MAG) welding, is a semi-automatic or automatic arc welding process in which a continuous and consumable wire electrode ("welding wire") and a shielding gas are fed through a welding gun.

FIGS. 1 and 2 illustrate the basic design of a conventional industrial GMAW system. As shown in these figures, GMAW system 10 includes electrical power source 12, wire drive assembly 14, shielding gas supply system 16, and cable assembly 18 for carrying electrical power, welding wire and shielding gas to a workpiece 20 to be welded. Wire drive assembly 14 typically includes reel stand 22 for carrying a spool 24 of a continuous, consumable wire electrode as well as drive mechanism 26 including one or more drive wheels (not shown) for driving welding wire from spool 24 through cable assembly 18 to workpiece 20. Meanwhile, shielding gas supply system 16 normally includes shielding gas source 28 and gas supply conduit 30 in fluid communication with cable assembly 18.

As illustrated especially in FIG. 2, cable assembly 18 typically takes the form of an elongated flexible cable 32 attached on one end to power source 12, wire drive assembly 14 and gas supply system 16 and on its other end to weld gun 34. As illustrated in FIG. 3, which is a radial cross-section of flexible cable 32, this flexible cable normally includes an electrical cable 34 for providing welding electrical power to the contact tip of weld gun 40, gas conduit 36 for transporting shielding gas, and flexible sheath 48 for housing the welding wire.

In practice, flexible cable 32 is normally at least 10 feet (~3 m) long, more typically at least 15 feet (~4.6 m), at least 20 feet (~6.1 m), at least 25 feet (~7.6 m), or even at least 30 feet (~9.1 m) long, so that electrical power source 12, wire drive assembly 14 and shielding gas supply system 16 can remain essentially stationary while weld gun 34 is moved by hand to various different locations. In addition, flexible cable 32 is normally made as flexible as possible, since this provides the greatest degree of flexibility in terms of moving and positioning weld gun 34 in any desired location. So, for example, flexible cable 32 is normally made flexible enough so that it can make relatively tight bends, such as being coiled into multiple revolutions, as illustrated in FIG. 2.

In order to prevent welding wire from snagging inside flexible cable 32, the welding wire is threaded through the interior of a flexible sheath 48. Normally, this flexible sheath is made from a metal wire tightly wound in a spiral whose inside diameter is only slightly larger than the outside diameter of the welding wire, since this structure provides a high degree of flexibility in flexible cable 32 while simultaneously preventing contact between the welding wire and other components inside the flexible cable.

Because of the length and flexibility of elongated flexible cable 32, it often takes a comparatively great amount of force to drive welding wire from spool 24 through cable assembly 18 onto workpiece 20. Therefore, it is common practice in industry to coat the welding wire with a wire feeding lubricant for reducing the coefficient of friction between its external surfaces and the internal surfaces the flexible sheath through which it passes. Sodium and calcium based soaps, e.g., sodium stearate and calcium stearate, are most commonly used for this purpose. Alternatively, certain solid particulate materials, such as $MoS_2$, $WS_2$, ZnO (normally together with $WS_2$), graphite and/or PTFE (Teflon), have also been used for this purpose.

A real advantage of soap based feeding lubricants is lubricity or feedability, i.e., the ability of the lubricant to enable transport of the welding wire from its supply spool to the weld gun assembly with minimal force and as smoothly as possible, especially when feeding is interrupted with numerous starts and stops. This is because soap-based lubricants are generally soft and pliable in the sense that, under the temperatures, shear stresses and other localized conditions encountered during feeding, soap-based lubricant tend to soften or plasticize into slippery, pliable, semi-solid materials. Generally speaking, solid particulate feeding lubricants do not offer the same superior level of feedability, because they remain in hard, solid particulate form during the feeding operation.

Another advantage of soap based feeding lubricants is arc stability, i.e., the ability of the lubricant to promote a uniform, uninterrupted arc between the electrode tip and the workpiece being welded. A stable arc promotes formation of a uniform weld bead, because it is the arc that melts the electrode. Generally speaking, particulate feeding lubricants do not offer the same superior arc stability as soap based lubricants, again, because they remain in hard, solid particulate form during the feeding operation.

Although soap-based feeding lubricants are superior to solid particulate feeding lubricants in terms of feedability and arc stability, they are inferior in terms of hydrogen contamination of the weld metal that is formed, especially when cored welding electrodes are used. Excess hydrogen contamination can lead to increased cracking, and so using cored welding electrodes is often avoided in military and other applications where high strength weld joints are needed. See, for example, D. D. Harwig et al., Effects of Welding Parameters and Electrode Atmospheric Exposure on the Diffusible Hydrogen Content of Gas Shielded Flux Cored Arc Welds, Welding Research Supplement, September 1999, p 314-321.

Thus, it will be appreciated that there is an inherent problem with conventional welding wire feeding lubricants— those which provide the desired degree of feedability (lubricity) for use in GMAW equipment generate unacceptable amounts of hydrogen contamination while those which produce acceptably low levels of hydrogen contamination provide insufficient feedability (lubricity).

SUMMARY

In accordance with this invention, it has been found possible to provide improved welding wire feeding lubricants achieving both objectives, i.e., providing the desired degree of feedability (lubricity) for use in GMAW equipment without generating unacceptable amounts of hydrogen contamination, by formulating the feeding lubricant to be a mixture of a solid particulate lubricant and a soap-based lubricant but only if the amount of soap based lubricant in this mixture is about 40 wt. % or less.

Thus, this invention provides an improved welding wire feeding lubricant comprising about 10 to 40 wt. % of at least one soap-based lubricant, about 40 to 90 wt. % of at least one solid particulate lubricant selected from $MoS_2$, $WS_2$, ZnO, graphite and PTFE and up to 20 wt. % of at least one optional additional lubricant ingredient.

In addition, this invention also provides an improved welding electrode for use in GMAW and other arc welding processes, the improved welding electrode comprising a cored welding electrode coated with the above welding wire feeding lubricant.

In addition, this invention further provides an improved GMAW process in which a lubricated welding wire is fed by means of a drive assembly to the workpiece through an elongated flexible sheath and a weld gun in communication with the elongated flexible sheath, wherein the lubricated welding wire comprises a cored welding electrode coated with the above feeding lubricant.

BRIEF DESCRIPTION OF THE DRAWINGS

This invention may be more readily understood by reference to the following drawings in which.

DETAILED DESCRIPTION

Figure 1:
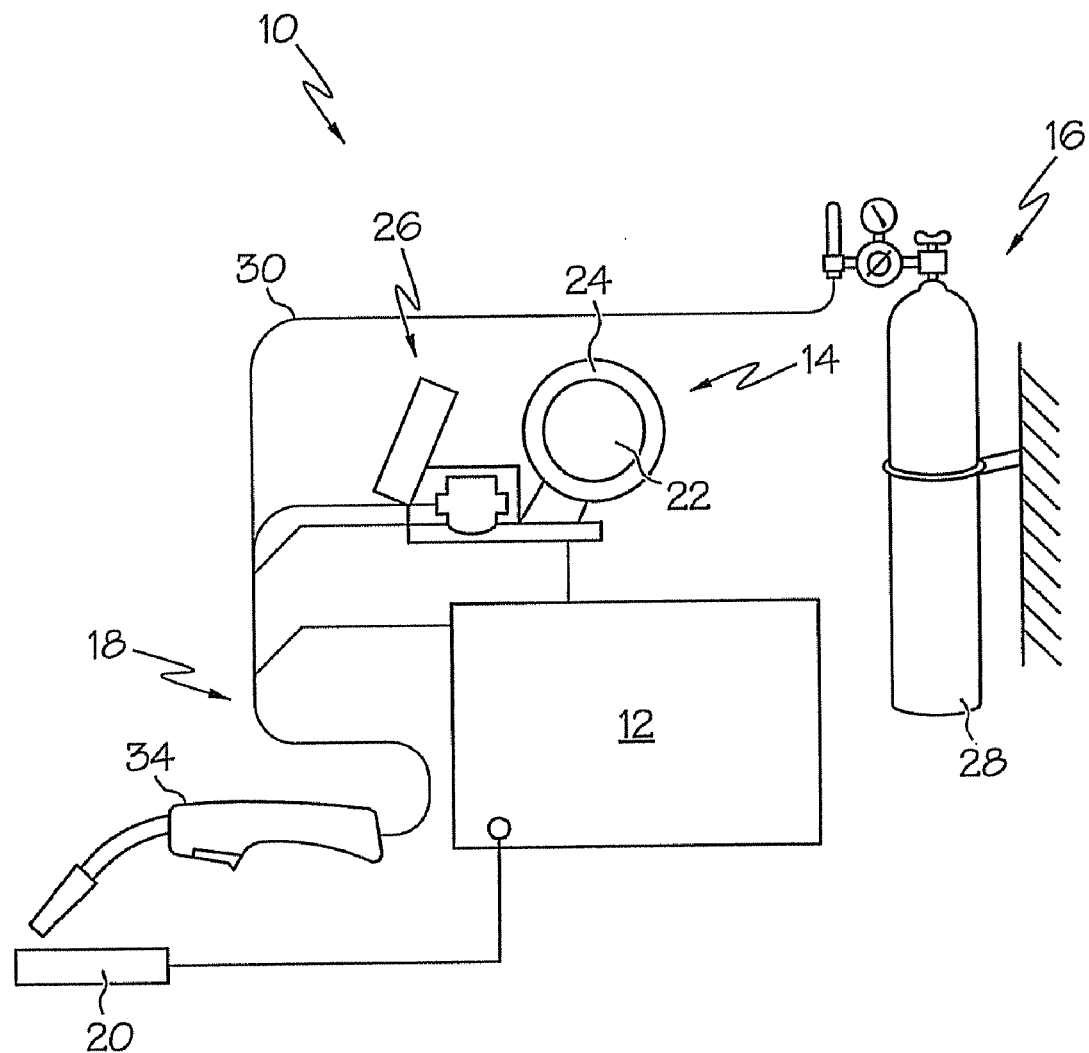
FIGS. 1 and 2 are schematic and perspective views illustrating a conventional GMAW welding system.
Figure 2:
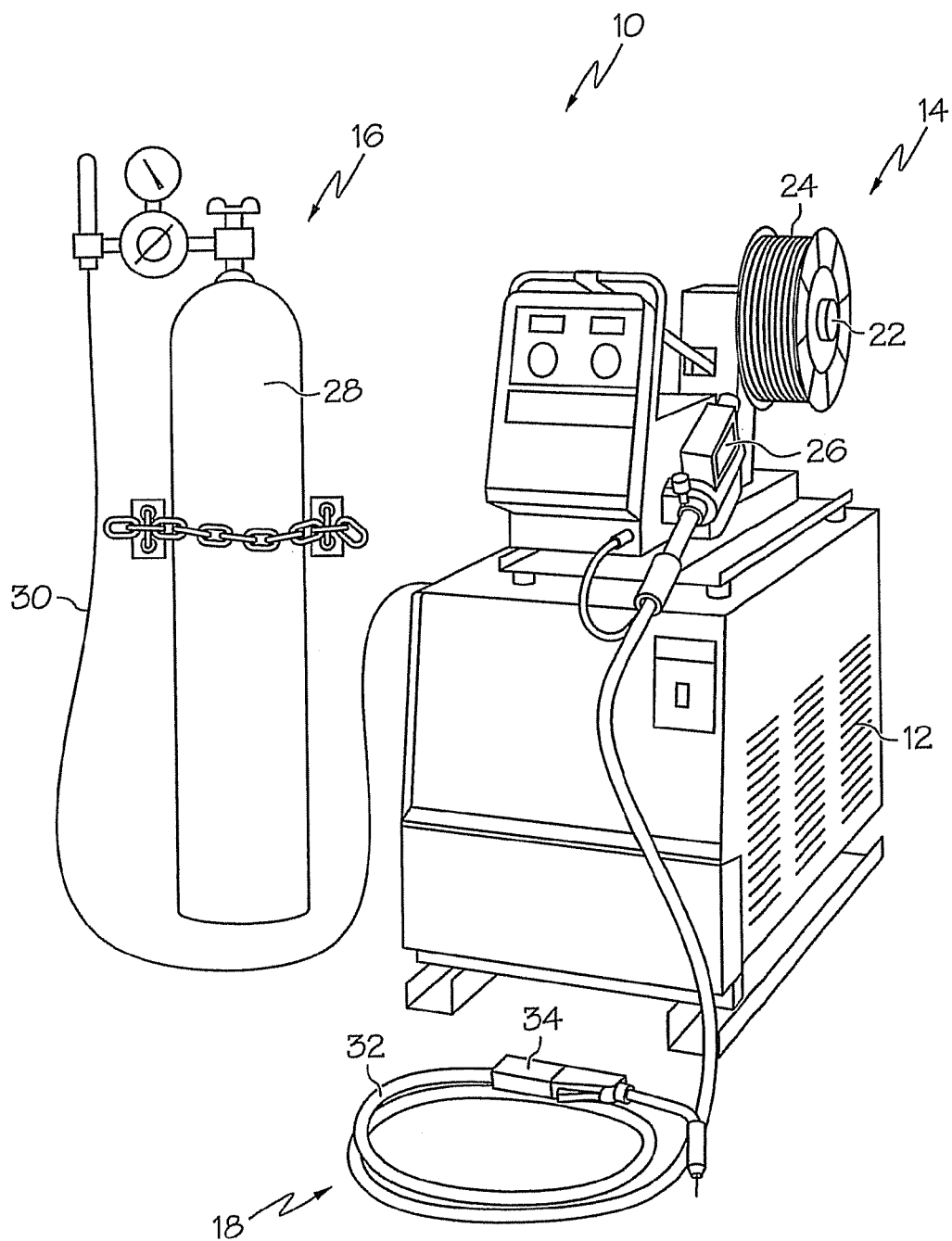
Figure 3:
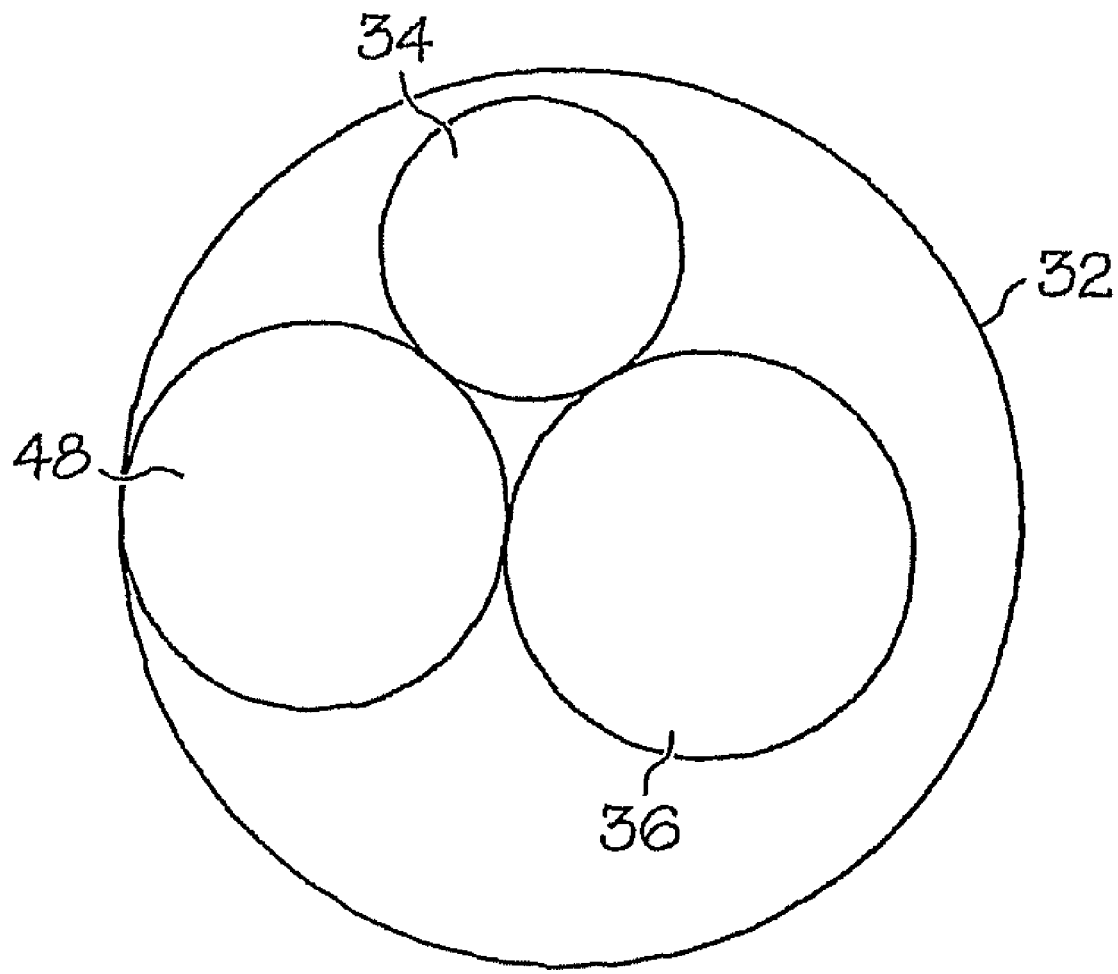
FIG. 3 is a schematic radial cross section of a typical elongated flexible cable used in the cable assembly of the GMAW system of FIGS. 1 and 2.

In accordance with this invention, the feeding lubricant on a welding electrode used in GMAW and other arc welding processes is composed of a mixture of a solid particulate lubricant and a soap-based lubricant in which the amount of soap based lubricant is about 40 wt. % or less. With this approach, the amount of unwanted diffusible hydrogen that is introduced into the weld is substantially reduced compared with conventional practice in which the feeding lubricant is composed entirely of a conventional soap based lubricant. Nonetheless, the superior feedability and arc stability made possible by these soap based type lubricants are preserved.

Cored Welding Electrodes

This invention relates in general to arc welding, and in particular GMAW, using any type of welding electrode. Normally, however, it will be carried out in connection with using cored welding electrodes, especially metal cored electrodes, since hydrogen contamination is a problem most commonly found in this type of welding operation.

Cored welding electrodes are welding consumables having a tubular core or interior region surrounded by an outer sheath. There are two basic varieties, metal cored electrodes and flux cored electrodes. In a metal cored electrode, the core of the electrode is formed predominantly from one or more metals to be incorporated into the weld that will be formed. Normally, the core will contain at least about 80 wt. % metal, with the balance being flux and other conventional ingredients as further discussed below in connection with flux cored electrodes. More commonly, the core will contain at least about 85 wt. % metal, at least about 90 wt. % metal, or even at least about 95 wt. % metal, with the balance being flux and other conventional ingredients.

In a flux cored electrode, the core of the electrode is formed predominantly from one or more components that aid the welding process such as fluxing elements, i.e., elements producing an extensive slag that covers the weld bead until cooled, deoxidizing and denitriding agents, and elements that stabilize the welding arc.

Cored welding electrodes are typically constructed beginning with a flat metal strip that is initially fowled first into a "U" shape. The core fill material is then deposited into this "U," and the strip is closed into a tubular configuration by drawing the filled strip through one or more dies and/or forming rolls to compact the core material and to set the final diameter of the cored welding electrode. See, U.S. Pat. No. 2,785,285, U.S. Pat. No. 2,944,142, U.S. Pat. No. 3,534,390, and U.S. Published Application No. 2006/0255027, the disclosures of which are incorporated herein by reference.

Soap-Based Lubricants

Generally speaking, any soap-based lubricant which has previously been used, or which may be used in the future, as a welding wire feeding lubricant can be used as the soap-based lubricant of this invention. In this regard, soap-based lubricants (sometimes referred to as "dry feeding lubricants") comprise fatty acid salts of metal cations, although non-metallic cations such as ammonium can also be used. Both saturated and unsaturated (mono-, di- and poly-unsaturated) fatty acids can be used for this purpose. Normally, the fatty acid contains about 8-24 carbon atoms, although fatty acids having 12-20 or even 14-18 carbon atoms are more typical. Stearic, oleic, linoleic or palmitic acid, or more commonly a mixture of these acids, are even more typical.

The metal cation of such salts can be monovalent, such as Na, K, Ru and Cs, in which case the soap-based feeding lubricant is generally water-soluble. In addition, the metal cation of such salts can be divalent or trivalent, in which case the soap-based feeding lubricant is generally water-soluble. Sodium is the most common monovalent cation in such salts, while calcium is the most common multivalent cation is such salts. In addition to calcium, the multivalent metal cation most commonly used in such salts is aluminum, barium, magnesium, zinc or a mixture of these metals. See, U.S. Pat. No. 5,898,022 to Maples, especially col. 4, line 5. Other metals such as B, In, Ga, Tl, Cd, Mg, Be, etc., for example, can also be used. See, also, U.S. Pat. No. 5,593,956 to Gzesh and U.S. Pat. No. 2,956,017 to Franks and Japanese Kokai [published unexamined patent application] 2005-074438 and 2005-095972. See, also, Kokai 2004-034131, Kokai 08-257788, Kokai 2002-219595, Kokai 2002-239779, U.S. Pat. No. 6,337,144 and Kokai 2003-039191. The disclosures of all of these patent documents are also incorporated herein by reference.

As well-appreciated in the art, commercially-available soap-based lubricants may be formulated with an excess of the fatty acid (i.e., an excess over the stoichiometric equivalent mount) or an excess of the metal cation. In addition, they are also typically based on a combination of the fatty acid soap lubricant itself together with various adjuvants such as fillers, pigments, dyes, extreme pressure additives, stabilizers, surfactants, thickeners, waxes and polymers, oils, esters, ethoxylates, metal wetting agents and so forth. Particular examples include, but are not limited to, soluble waxes such as paraffin waxes, microcrystalline, hydrogenated triglycerides, natural and synthetic spermaceti, and natural or synthetic waxes; oils and greases such as hydrocarbons, silicones, non-oxidizing vegetable oils, animal oils and greases; particulate fillers preferably exhibiting some inherent lubricity themselves such as talc, graphite, boron nitride, paint grade aluminum powder, and other fluorinated hydrocarbons, and certain types of ash or diatomaceous earth; and surfactants such as octyphenoxy-polyethoxyethanol-nonionic which is available under the brand name TRITON X 100®, for example. These and other adjuvants can be used in conventional amounts to provide their known effects, so long as they do not adversely affect the ability of the soap-based wire drawing lubricants of this invention to reduce or eliminate diffusible hydrogen in any substantial way.

Solid Particulate Lubricants

Generally speaking, any particulate solid which has previously been used, or which may be used in the future, as a welding wire feeding lubricant can be used as the solid particulate lubricant of this invention. In this context, "solid particulate" lubricant will be understood as referring to materials which remain in the form of hard, particulate solids under the conditions employed during the feeding operation. Soap-based lubricants, although normally solid when applied, are not "solid particulate" lubricants in this context, because they typically soften or plasticize into slippery, pliable, semi-solid materials under the temperatures, shear stresses and other localized conditions encountered during the feeding operation.

Typical particulate solids that are commonly used as solid particulate welding wire feeding lubricants include $MoS_2$, $WS_2$, ZnO (normally together with $WS_2$), graphite and/or PTFE (Teflon), and mixtures thereof. These materials will normally be used as the solid particulate lubricants of this invention because of availability and cost. However, other solid particulate welding wire feeding lubricants can also be used.

For example, the patent literature indicates that many different particulate solids are also useful as solid particulate wire feeding lubricants (or components of the lubricants) in the welding industry. For example, Japanese Kokai 2005-074438 indicates that sulfur based extreme pressure agents can be used for this purpose, while Kokai 10-193175 indicates that the fume powder generated during iron and steel refining and which is composed primarily of iron oxide can be used for this purpose. Meanwhile, Kokai 2004-202572 indicates that copper powder can be used for this purpose, while Kokai 09-141489 indicates that inorganic potassium compounds such as potassium borate can be used for this purpose. Similarly, Kokai 08-157858 indicates that phosphorous acid esters can be used for this purpose, while Kokai 2003-305587 indicates that iron, manganese and zinc phosphate films can be used for this purpose.

Similarly, Kokai 2006-095579 and Kokai 09-206987 indicate that calcium carbonate and boron nitride are analogues of molybdenum disulfide, at least when combined with a mineral such as mica, sericite or talc. Meanwhile, Kokai 09-323191 indicates that titanium dioxide, when combined with $MoS_2$ or $WS_2$, is an effective welding wire lubricant, while Kokai 08-057650 indicates that stainless steel powder, when combined with $WS_2$, is an effective welding wire lubricant. Similarly, Kokai 08-151548 indicates that potassium silicate can be used in combination with PTFE as an effective welding wire lubricant, while Kokai 06-285677 indicates that calcium and or sodium carbonate, fluoride or silicate of calcium or sodium, as well as silica acid glass, soda glass, potash glass and soda lime glass, when combined with PTFE or $MoS_2$, makes an effective welding wire lubricant. In the same way, Kokai 2006-095551 as well as many other Japanese Kokai indicate that phosphatide (a phospholipid) can be combined with $MoS_2$ for this purpose. These additional materials can also be used together with the "common" solid welding wire lubricants described above, in keeping with the above disclosures. In accordance with this invention, all of these materials, including mixtures thereof, can be used as the solid particulate wire feeding lubricant of this invention.

For convenience, all of the materials described in this section other than $MoS_2$, $WS_2$, ZnO, graphite and PTFE (Teflon), as well as all of the adjuvants described in the preceding section (i.e., all of the ingredients in the preceding section other than the soap-based lubricants), as well as all of the organic binders described below, are referred to herein as "additional lubricant ingredients."

The particle size of the solid particulate lubricant of the inventive wire feeding lubricant is not critical, and any particle size which has previously been used, or which may be used in the future, for this purpose is useful in this invention. Particle sizes on the order of about 0.5-15 μm. or even about 1-10 μm., are more interesting. Particle sizes on the order of about 1-2 μm are especially interesting, particularly when the welding wire being coated had a fairly rough surface.

Organic Binders

Commercially, solid particulate welding wire lubricants are often combined with a liquid or paste organic binder to bind the particulate to the welding electrode substrate. Such liquid or paste organic binders may also enhance lubricity and feedability, at least in some instances. Examples of common organic binders include viscous oils such as vegetable oil, mineral oil, and various synthetic oils as well as various organic solids such as petroleum wax and the like. Liquid carriers such as water and/or various alcohols, e.g., isopropanol, can also be included for ease of application, especially when solid (paste) organic binders are used. Although such liquid or paste organic binders can be included in the inventive feeding lubricants, they are desirably avoided since they normally decompose to yield diffusible hydrogen under use conditions. Similarly, all other additional lubricant ingredients of an organic nature are also preferably avoided, since they too normally decompose to yield diffusible hydrogen under use conditions.

Mixtures of Soap-Based Lubricants and Solid Particulate Lubricants

In accordance with this invention, the feeding lubricant on a welding electrode used in GMAW and other arc welding processes is composed of a mixture of a solid particulate lubricant and a soap-based lubricant in which the amount of soap based lubricant is about 40 wt. % or less. With this approach, the production of unwanted diffusible hydrogen is substantially reduced compared with conventional soap based lubricants while the superior feedability and arc stability made possible by these soap based lubricants is preserved. In particular, it has been found that it is possible in accordance with this invention to provide a feeding lubricant for GMAW which meets the H4 standard for diffusible hydrogen of ANSI/AWS A4 (Standard Method for Determination of the Diffusible Hydrogen Content of Martensitic, Bainitic, and Ferritic Steel Weld Metal Produced by Arc Welding), i.e., producing less than 4 milliliters $H_2$ per 100 grams of deposited weld metal, while simultaneously exhibiting a feedability (lubricity) essentially the same as that of conventional soap-based lubricants such as STEELSKIN® 411 (M) (Product A842) solid lubricant available from Henkel Technologies, Henkel Corporation of Madison Heights Mich., which is believed to be a sodium soap-based lubricant containing >60% stearate, and 1-10% each of sodium sulfate, sodium carbonate, sodium nitrate and zinc dialkyl thiophosphate.

The soap-based lubricant of the inventive feeding lubricant, in addition to providing its known lubricating and arc stabilizing functions, also provides a certain binding function in connection with binding the solid particulate lubricants to the electrode substrate. In accordance with this invention, it has been determined that even when this soap-based lubricant is used in limited amount, this binding function is sufficient to enable the organic binders normally required to bind solid particulate lubricants to a welding electrode substrate to be eliminated. As a result, production of diffusible hydrogen that is inherently generated when such organic binder are used is also eliminated. The overall result of this effect, in combination with the fact that the maximum concentration of soap-based lubricant in the inventive feeding lubricant is limited to about 40 wt. %, is that the amount of diffusible hydrogen produced by the inventive feeding lubricant is reduced to less than 4 milliliters $_{H2}$ per 100 grams of deposited weld metal even though the feedability of the inventive lubricant is essentially maintained.

As indicated above, the amount of soap-based feeding lubricant in the inventive lubricant should be no more than about 40 wt. %. This is because if the amount of soap-based lubricant exceeds about 40 wt. %, the amount of diffusible hydrogen produced will normally exceed the maximum allowed by the H4 standard for diffusible hydrogen of ANSI/AWS A4.3, i.e., 4 milliliters $H_2$ per 100 grams of deposited weld metal. Normally, the amount of soap-based feeding lubricant in the inventive feeding lubricant will be about 35 wt. % or less, more typically about 30 wt. % or less, based on the weight of the inventive feeding lubricant as a whole.

The minimum amount of soap-based lubricant in the inventive feeding lubricant should be enough to insure that the feedability of the feeding lubricant is not compromised to any significant degree. That is to say, the amount of soap-based lubricant in the inventive feeding lubricant should be enough so that the inventive feeding lubricant exhibits a feedability (lubricity) substantially the same as that of conventional soap-based lubricants such as STEELSKIN® 411 (M). Desirably, the amount of soap-based lubricant in the inventive feeding lubricant is enough so that the inventive feeding lubricant exhibits a maximum feeding force of less than 22 pounds (~98 Newtons) for welding wires having diameters of 1/16 in (1.59 mm), less than 14 pounds (~62 Newtons) for welding wires having diameters of 0.052 in (1.32 mm), and less than 12 pounds (~53 Newtons) for welding wires having diameters of 0.045 in (1.14 mm) when measured by the analytical test described in the working examples below. Generally speaking, this means that the amount of soap-based lubricant in the inventive feeding lubricant should normally be at least about 10 wt. %, at least about 15 wt. % or even at least about 20 wt. %, based on the weight of the inventive feeding lubricant as a whole.

In those embodiments of this invention in which the inventive feeding lubricant is composed solely of a solid particulate lubricant and soap-based lubricant, the amount of solid particulate lubricant should be at least about 60 wt. %, based on the weight of the inventive feeding lubricant as a whole. This is because if smaller amounts of solid particulate lubricant are used, the amount of diffusible hydrogen produced by the inventive feeding lubricant might exceed the maximum allowed by the I-14 standard of ANSI/AWS A4.3, i.e., less than 4 milliliters $H_2$ per 100 grams of deposited weld metal. Concentration of solid particulate lubricant of at least about 65 wt. %, at least about 70 wt. %, at least about 75 wt. %, at least about 80 wt. %, or even at least about 85 wt. %, are more typical.

In those embodiments in which the inventive feeding lubricant contains an additional lubricant ingredient such as those described above, up to about 20 wt. %, based on the weight of the inventive feeding lubricant as a whole, of the solid particulate lubricant described above can be replaced with these additional lubricant ingredients. Embodiments in which up to about 15 wt. %, up to about 10 wt. %, or even up to about 5 wt. % of the solid particulate lubricant are replaced with these additional lubricant ingredients are more interesting.

Thus, the inventive feeding lubricant will normally contain about 10 to 40 wt. %, more commonly, about 15 to 35 wt. %, or even about 20 to 30 wt. % soap-based lubricant, with the balance being the solid particulate lubricant or a mixture of the solid particulate lubricant and one or more additional lubricant ingredients as indentified above. In that case, i.e., when the inventive feeding lubricant contains one or more additional lubricant ingredients in addition to the soap-based lubricant and the solid particulate lubricant, the total amount of such additional lubricant ingredients should be no greater than about 20 wt. %, more desirably no greater than about 10 wt. %, based on the weight of the inventive feeding lubricant as a whole. If so, the amount of solid particulate lubricant can be as low as at least 40 wt. %, more desirably at least 50 wt %.

Inventive feeding lubricants containing about 20 to 30 wt. % soap-based lubricant with the balance being solid particulate lubricants, especially $MoS_2$ and $WS_2$, are especially interesting, while those containing about 25 wt. % soap-based feeding lubricant and about 75 wt. % $MoS_2$, $WS_2$ or both are particularly interesting.

Lubricant Loading

The amount of inventive feeding lubricant that can be applied to the welding electrode in particular applications of this invention can vary widely, and essentially any amount can be used which provides the desired degree of feedability. Generally speaking, the amount of inventive feeding lubricant used can be as much as 10 gms/m$^2$ of wire surface area to as little as 0.001 gms/m$^2$ of wire surface area. Lubricant loadings on the order of 0.01 to 1 gm/m$^2$, or even 0.05 to 0.5 gm/m$^2$ of wire surface area, are especially interesting.

WORKING EXAMPLES

In order to more thoroughly describe this invention, the following working examples were carried out. In these examples, a series of metal core welding electrodes was produced by a conventional continuous process as generally described in the above-noted U.S. 2006/0255027, in which a mild steel metal sheath was wrapped around a powder metal core to form a cylindrical preform and the preform so formed then drawn trough a series of lubricated extrusion dies to compress the preform to the desired finished diameter. The electrode wires so obtained were then baked in a furnace to decompose any residual drawing lubricant that may still have been present on the completed electrodes, after which the completed electrodes were wound around separate take up rolls for further use as described below.

Four different electrode wires were produced, two smaller wires having finished diameters of 0.045 inch (1.143 mm) and two larger wires having finished diameters of 1/16 inch (1.5875 mm). Since the amount of diffusible hydrogen exhibited by a welding electrode can be influenced by the amount of residual drawing lubricant remaining on its surfaces (or its decomposition products) after manufacture, one of the smaller wires and one of the larger wires were made with less residual drawing lubricant while the other two wires were made with more residual drawing lubricant. A sodium soap drawing lubricant was used to make these welding wires, and so the surface sodium count as measured by XRF (X-ray Fluorescence) provided an accurate indication of whether more or less residual drawing lubricant (or its decomposition products) remained on surfaces of these welding wires after manufacture. In this regard, the two welding wires made with less drawing lubricant exhibited a surface sodium count of 4-8 counts, while the two wires made with more drawing lubricant exhibited a surface sodium count of 8-12 counts.

Control Experiments A and B—Conventional Feeding Lubricants

In order to demonstrate the effect the chemical composition of a feeding lubricant can have on hydrogen contamination as well as feedability (lubricity) in GMAW, a series of control experiments was conducted in which the above welding wire electrodes were coated with different conventional welding wire feeding lubricants and the lubricated welding wires so obtained then tested to measure diffusible hydrogen and feedability.

In these tests, diffusible hydrogen was measured by the ANSI/AWS A4.3 analytical procedure, while feedability was determined by the following analytical test. A copper block was welded in a conventional manner using a Lincoln Electric CV 400 power source and a modified LN-9F GMA feeder to supply a 1/16 inch (1.5875 mm) diameter metal cored welding wire through a weld gun to the weld site. The welder was equipped with a 25 foot (7.6 meters) flexible feeding cable including a welding wire supply sheath in the form of a wire wound cylinder having an inside diameter sized for feeding welding wires with diameters of 0.052 inch to 1/16 inch. The feeding cable was wrapped 1½ times around a 12 inch (~30 cm) diameter mandrel to provide suitable resistance to the movement of the welding wire through the feeding wire supply sheath and weld gun, while the wire supply feed rollers of the welder were equipped with a monitoring system allowing the average and instantaneous feeding forces needed to drive the welding wire through the feeding sheath to be monitored and recorded. 1/16 inch welding wire was supplied at a rate of 265 in/min (673 cc/min) for a total time of about 15 minutes per test.

In addition to diffusible hydrogen and feedability, the residual sodium content of the fully lubricated welding wire, i.e., the welding wire obtained after being coated with the particular feeding lubricant being used, was also measured by XRF to determine its surface sodium concentration.

Four different sets of control experiments were run, one for each of the four different welding wires produced. Thus, the same control experiments were run on the following four different electrode wires Set 1: smaller wire carrying less residual drawing lubricant, Set 2: smaller wire carrying more residual drawing lubricant, Set 3: larger wire carrying less residual drawing lubricant, and Set 4: larger wire carrying more residual drawing lubricant.

In each set of control experiments, six different conventional feeding lubricants were tested. In addition, a seventh control experiment was run in which no lubricant at all was used for comparative purposes. The chemical compositions of the different conventional feeding lubricants used are set forth in the following Table 1.

TABLE 1

Compositions of Different Conventional Feeding Lubricants

| Lubricant | Composition |
|---|---|
| NL | None |
| A | 100% MoS$_2$ |
| B | Borax free sodium soap with less than 40 wt. % additives like sodium nitrite & sodium carbonate |
| C | Sodium soap with less than 40 wt. % additives like carbonic acid sodium salt |
| E | Sodium soap with less than 40 wt. % additives like graphite, MoS$_2$, sodium carbonate & crystalline silica |
| F | Sodium soap with less than 40 wt. % additives like graphite, sodium carbonate & crystalline silica |
| G | STEELSKIN ® 411 (M) (Sodium soap with less than 40 wt. % additives like sodium sulfate, sodium carbonate, sodium nitrate & dialkyl thiophosphate) |

Diffusible Hydrogen Control Experiments—Smaller Diameter Wires

Figure 4:
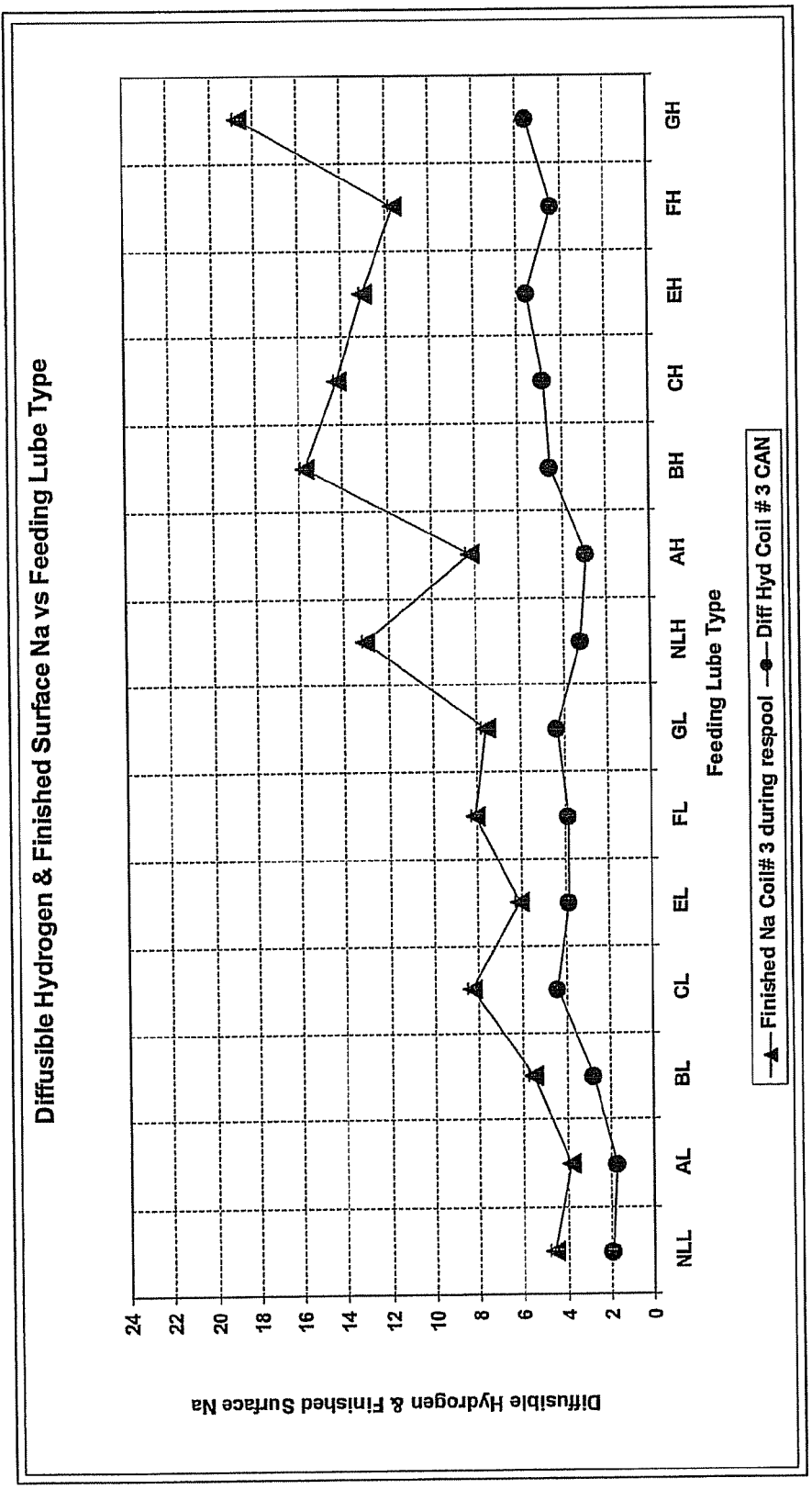
FIG. 4 is a graph showing the amount of diffusible hydrogen produced as well as the surface sodium count of the fully lubricated electrodes used in the Diffusible Hydrogen Control Experiments described below as a function of the composition of the feeding lubricant.

Since the smaller diameter wires (0.045 inch-1.143 mm) are more sensitive to hydrogen pick up while the larger diameter wires (1/16 inch-1.5875 mm) are more sensitive to feedability, the smaller diameter wires were used in these Diffusible Hydrogen Control Experiments while the larger diameter wires were used in the Feedability Control Experiments discussed below. Accordingly, in these Diffusible Hydrogen Control Experiments, two sets of experiments were run, Set 1 using smaller wires carrying less residual drawing lubricant, and Set 2 using smaller wires carrying more residual drawing lubricant. The results of these experiments are reproduced in FIG. 4, which is a graph showing the amount of diffusible hydrogen produced (circles) as well as the surface sodium count of the fully lubricated electrodes used (triangles) as a function of the composition of the feeding lubricant. In this figure, the suffix "L" is used to identify the control experiments of Set 1 in which less drawing lubricant was used in manufacture while the suffix "H" is used to identify the control experiments of Set 2 in which more drawing lubricant was used in manufacture.

As shown in this figure, the control experiments of Set 1 in which less drawing lubricant was used in manufacture (suffix "L") generally produce less diffusible hydrogen (circles) than the control experiments of Set 2 in which more drawing lubricant was used in manufacture (suffix "H"). Similarly, the control experiments of Set 1 generally produce less residual sodium (triangles) than the control experiments of Set 2. In addition, FIG. 4 also shows that the two control experiments in which the feeding lubricant used contained no sodium soap (experiments AL and AH in which the feeding lubricant was 100% MoS$_2$) produce the lowest amount of diffusible hydrogen of all, essentially the same as that produced by control experiments NLL and NLH in which no feeding, lubricant at all was used. Together, these control experiments show that welding wires that are made with soap based drawing lubricants and soap based feeding lubricants soap inherently produce significant amounts of diffusible hydrogen.

Feedability Control Experiments—Larger Diameter Wires

As indicated above, the larger diameter wires (1/16 inch-1.5875 mm) are more sensitive to feedability, and so in these Feedability Control Experiments, two sets of experiments were run, Set 3 using larger wires carrying less residual drawing lubricant, and Set 4 using larger wires carrying more residual drawing lubricant. The results obtained are graphically presented in FIG. 5, which is a chart showing the average and maximum feeding force required as a function of feeding lubricant composition. Like FIG. 4, FIG. 5 also uses the suffix "L" to identify the control experiments in which less drawing lubricant was used in manufacture (Set 3) and the suffix "H" to identify the control experiments in which more drawing lubricant was used in manufacture (Set 4). Note, also, from this figure that a maximum feeding force of about 22 pounds (~98 Newtons) is generally regarded as the limit for an acceptable feeding lubricant for use in GMAW in this particular analytical test. That is to say, in this particular analytical test, a feeding lubricant in which the maximums force needed to drive the welding wire through its feeding sheath exceeded about 22 pounds (~98 Newtons) anytime during the course of the 15 minute test was regarded as unacceptable.

Figure 5:
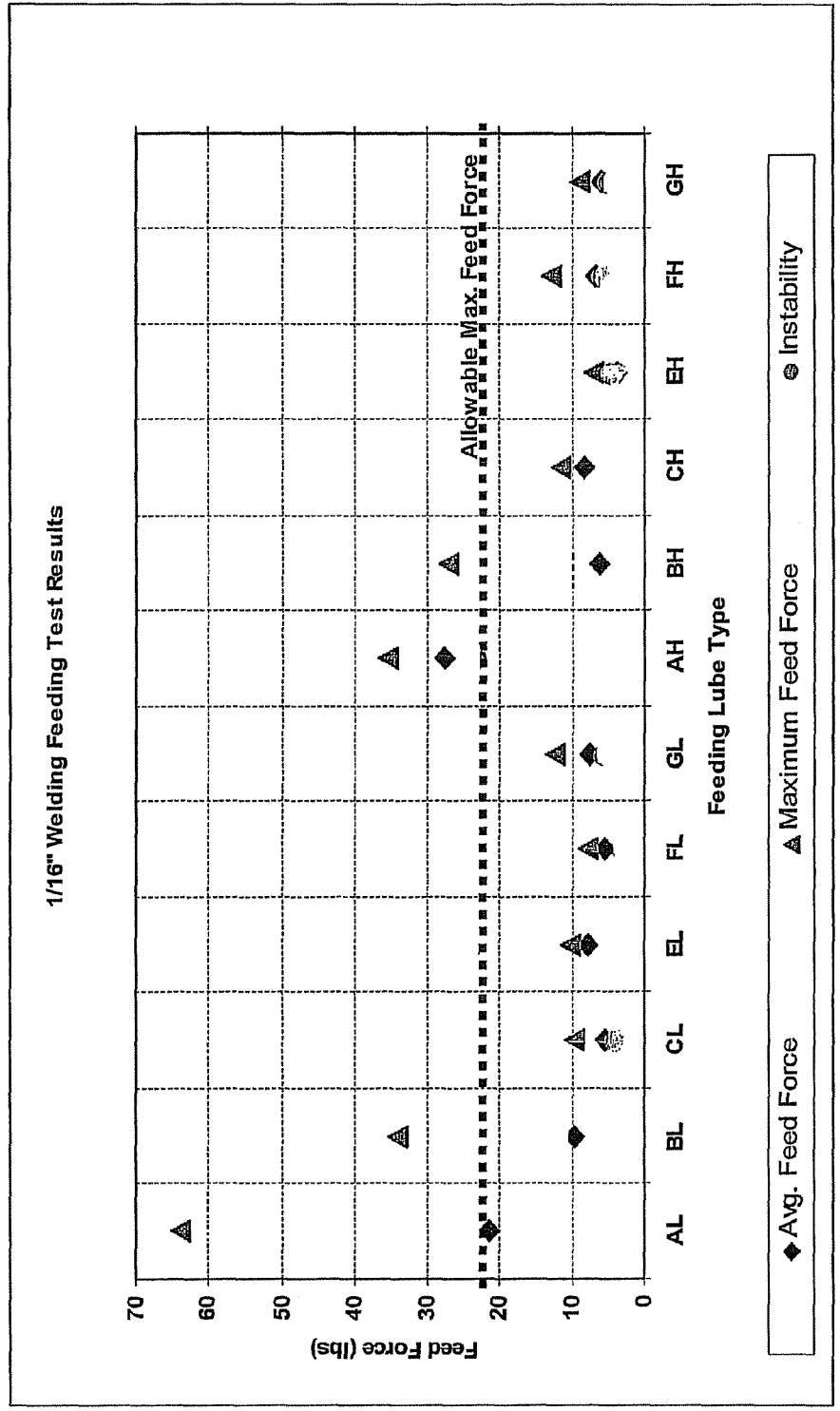
FIG. 5 is a chart showing the average and maximum feeding force required as a function of feeding lubricant composition in the Feedability Control Experiments described below.

As shown in FIG. 5, the feedability of the two electrode wires using 100% $MoS_2$ as the feeding lubricant (AL and AH) was much worse than that of all the other electrode wires in which the feeding lubricant used contained at least 60 wt. % of a soap based lubricant. In particular, FIG. 5 shows that the maximum feeding force required for electrode wire AL (made with 100% $MoS_2$ feeding lubricant and less drawing lubricant) was approximately 65 pounds (289 Newtons), which far exceeds the maximum allowable value of about 22 pounds (~98 Newtons). Similarly, the maximum feeding force required for electrode wire AH (made with 100% $MoS_2$ feeding lubricant and more drawing lubricant) was approximately 35 pounds (156 Newtons), still substantially in excess of the maximum allowable value of about 22 pounds (~98 Newtons). In contrast, the maximum feeding force required for all of the other electrode wires (which all carried a sodium soap based feeding lubricant) were uniformly less than the maximum allowable value of about 22 pounds (~98 Newtons). This indicates that soap based feeding lubricants are necessary for providing the lubricity needed for use in conventional GMAW equipment and that $MoS_2$ and other conventional particulate solid feeding lubricants are incapable of providing this degree of lubricity.

Together, the above Diffusible Hydrogen and Feedability Control Experiments illustrate the problem with conventional feeding lubricants—those which provide the desired degree of lubricity for use in GMAW equipment generate unacceptable amounts of diffusible hydrogen while those which produce acceptably low levels of diffusible hydrogen provide insufficient lubricity.

Examples 1 and 2 and Comparative Examples A, B and C

The above Diffusible Hydrogen and Feedability Control Experiments were repeated using feeding lubricants composed of mixtures of different amounts of $MoS_2$ and soap based lubricants, in accordance with this invention. The particular welding wires used were the same as used in the above Control Experiments made so as to have a surface sodium content after manufacture (before application of the feeding lubricant) of 4-10 counts, as measured by XRF. In addition, in one experiment, Comparative Example B, a feeding lubricant essentially the same as Lubricant F of Table 1 was used, except that all of the $MoS_2$ in that lubricant was replaced with graphite. The compositions of the various feeding lubricants used are set forth in the following Table 2:

TABLE 2

Compositions Feeding Lubricants

| Example | Composition (Wt. % $MoS_2$/Wt. % Na Soap) |
|---|---|
| 1 | 80/20 |
| A | 90/10 |
| B | Lubricant F of Table 1 with all $MoS_2$ replaced with graphite |
| C | 50/50 |
| 2 | 75/25 |

The results obtained are set forth in the following Table 3:

TABLE 3

Diffusible Hydrogen and Feedability Results

| | Surface | Diffusible Hydrogen | | | | | Feeding Force (lbs) | |
|---|---|---|---|---|---|---|---|---|
| Ex | Na | Test 1 | Test 2 | Test 3 | Test 4 | Ave | Ave | Max |
| 1 | 6.3 | 3.9 | 3.9 | 3.8 | 3.6 | 3.8 | 11.48 | 14.43 |
| A | 5.9 | 4.5 | 3.8 | 3.7 | 3.3 | 3.8 | 14.42 | 0* |
| B | 6.5 | 4.8 | 4 | 4.1 | 4.8 | 4.4 | 14.18 | 24.74 |
| C | 7.5 | 5.1 | 5.1 | 5.1 | 4.9 | 5.1 | 10.01 | 12.48 |
| 2 | 6.0 | 3.3 | 3.1 | 3.4 | 3.1 | 3.2 | 9.38 | 12.04 |

*Feeding test stopped after 11.6 minutes because of a jam. In other words, the maximum force needed to drive the welding wire through its supply sheath exceed the capacity of the feed rollers to supply this force.

As shown in Table 3, the maximum feeding force required by the feeding lubricants of Examples 1 and 2 were substantially less than the maximum acceptable value of 22 pounds (~98 Newtons) even though the diffusible hydrogen produced by these feeding lubricants was below the maximum allowed by the H4 standard of ANSI/AWS A4.3, i.e., less than 4 milliliters $H_2$ per 100 grams of deposited weld metal. In contrast, the feeding lubricant of Comparative Example A (only 10 wt. % Na Soap) was incapable of achieving a maximum feeding force of 22 pounds (~98 Newtons), while the feeding lubricant of Comparative Example C (50 wt. % Na Soap) was incapable of producing diffusible hydrogen in amounts less than required by the H4 standard of ANSI/AWS A4.3, i.e., less than 4 milliliters $H_2$ per 100 grams of deposited weld metal. This shows that, for each combination of solid particulate and soap-based feeding lubricants used, the relative amounts of these ingredients must be appropriately balanced in order to achieve the feedability and diffusible hydrogen desired. Meanwhile, Comparative Example B when compared with Control Experiments FL and FH of FIG. 5 shows that even if a soap based feeding lubricant contains more than 50 wt. % soap, other ingredients present (e.g., sodium carbonate and crystalline silica) may prevent it from exhibiting the lubricity needed for use in GMAW applications.

Welding Evaluations

Three of the feeding lubricants of Table 2, i.e., the lubricants of Examples 1 and 2 and Comparative Example A, were compared with a conventional feeding lubricant (STEEL-SKIN® 411 (M) from Henkel). In this comparison, conventional 1/16 inch metal cored welding electrodes each carrying one of the feeding lubricants to be tested and supplied by a Lincoln Electric PowerWave 455M welder equipped with a Power Feed 10M feeder, were used to form horizontal ½ inch (~1.3 mm) fillets in a shot blasted or mill scale plate at a rate of 250 in/min (~6.35 m/min) using an argon shielding gas containing 10 or 25% $CO_2$. Four different tests were done for each feeding lubricant, using identical conditions for each test. Each feeding lubricant was evaluated with respect to five different variables commonly associated with good welding practice, i.e., Arc Action, Amount of Spatter, Slag Appearance, Slag Removal and Bead Appearance, by having a skilled welder assign a value of from 1 (best) to 4 (worst) to each of the above variables.

The three feeding lubricants tested, i.e., the lubricants of Examples 1 and 2 and Comparative Example A, were essentially identical in terms of their performance with respect to all of these variables. This indicates that combining a minor amount of soap based lubricant and a conventional solid particulate lubricant as done in accordance with this invention does not adversely affect the way these lubricants perform in connection with these common welding variables.

Although only a few embodiments of this invention have been described above, many modifications can be made without departing from the spirit and scope of this invention. All such modifications are intended to be included within the scope of this invention, which is to be limited only by the following claims:

The invention claimed is:

1. A feeding lubricant for use on a welding electrode, the feeding lubricant consisting essentially of about 40 to 90 wt. % of at least one solid particulate lubricant selected from $MoS_2$, $WS_2$, ZnO, graphite and PTFE, up to 20 wt. % of at least one optional additional particulate lubricant ingredient, and at least one soap based lubricant in an amount sufficient so that
  (a) the maximum amount of force needed to drive a 1/16 inch (1.59 mm) diameter welding wire through a flexible supply sheath which is formed from a wire wound cylinder, which is 25 feet long and which is wrapped 1½ times around a 12 inch diameter mandrel is no greater than 22 pounds (~98 Newtons), and
  (b) produces less than 4 milliliters $H_2$ per 100 grams of deposited weld metal when tested according to ANSI/AWS A4.3,
this amount of soap based lubricant being about 10 to 40 wt. %.

2. The feeding lubricant of claim 1, wherein the feeding lubricant is essentially free of organic binders.

3. The feeding lubricant of claim 2, wherein the feeding lubricant consists essentially of about 10 to 40 wt. % of at least one Na or Ca-containing soap-based lubricant and about 60 to 90 wt. % of at least one solid particulate lubricant.

4. The feeding lubricant of claim 1, wherein the solid particulate lubricant is at least one of $MoS_2$ and $WS_2$.

5. The feeding lubricant of claim 1, wherein the feeding lubricant consists essentially of about 15 to 35 wt. % of at least one Na or Ca-containing soap-based lubricant, with the balance consisting essentially of at least one of $MoS_2$, $WS_2$, ZnO, graphite and PTFE.

6. The feeding lubricant of claim 5, wherein the feeding lubricant comprises about 20 to 30 wt. % of at least one Na or Ca-containing soap-based lubricant, with the balance consisting essentially of $MoS_2$, $WS_2$ or both.

7. The feeding lubricant of claim 6, wherein the feeding lubricant comprises about 20 to 30 wt. % of a Na containing soap-based lubricant, with the balance being essentially $MoS_2$.

8. The feeding lubricant of claim 7, wherein the feeding lubricant consists essentially of about 25 wt. % of a Na containing soap-based lubricant, with the balance being essentially $MoS_2$.

9. A lubricated cored welding electrode comprising cored welding electrode coated with a feeding lubricant comprising the feeding lubricant of claim 1.

10. The lubricated cored welding electrode of claim 9, wherein the feeding lubricant is essentially free of organic binders.

11. The lubricated cored welding electrode of claim 10, wherein the feeding lubricant consists essentially of about 10 to 40 wt. % of at least one Na or Ca-containing soap-based lubricant and about 60 to 90 wt. % of at least one solid particulate lubricant.

12. The lubricated cored welding electrode of claim 9, wherein the feeding lubricant consists essentially of about 15 to 35 wt. % of at least one Na or Ca-containing soap-based lubricant, with the balance consisting essentially of $MoS_2$, $WS_2$ or both.

13. The lubricated cored welding electrode of claim 12, wherein the feeding lubricant comprises about 20 to 30 wt. % of a Na containing soap-based lubricant, with the balance being essentially $MoS_2$.

14. The lubricated cored welding electrode of claim 13, wherein the feeding lubricant consists essentially of about 25 wt. % of a Na containing soap-based lubricant, with the balance being essentially $MoS_2$.

15. The lubricated cored welding electrode of claim 9, wherein the cored welding electrode is a metal cored welding electrode.

16. A GMAW process for forming a weld in a metal workpiece in which a lubricated welding wire is fed by means of a drive assembly to the workpiece through an elongated flexible cable and a weld gun in communication with the elongated flexible cable, wherein the lubricated welding wire comprises the lubricated cored welding electrode of claim 9.

17. The GMAW process of claim 16, wherein the feeding lubricant is essentially free of organic binders.

18. The GMAW process of claim 16, wherein the feeding lubricant consists essentially of about 10 to 40 wt. % of at least one Na or Ca-containing soap-based lubricant and about 60 to 90 wt. % of at least one solid particulate lubricant.

19. The GMAW process of claim 18, wherein the feeding lubricant comprises about 20 to 30 wt. % of a Na containing soap-based lubricant, with the balance being essentially $MoS_2$.

20. The GMAW process of claims 19, wherein the feeding lubricant consists essentially of about 25 wt. % of a Na containing soap-based lubricant, with the balance being essentially $MoS_2$.

21. The GMAW process of claim 16, wherein the cored welding electrode is a metal cored welding electrode.

22. A GMAW process for forming a weld in a metal workpiece in which a lubricated welding wire is fed by means of a drive assembly to the workpiece through an elongated flexible cable and a weld gun in communication with the elongated flexible cable, wherein the lubricated welding wire comprises a welding electrode coated with a feeding lubricant comprising the feeding lubricant of claim 1.

23. The GMAW process of claim 22, wherein the feeding lubricant is essentially free of organic binders.

24. The GMAW process of claim 22, wherein the feeding lubricant consists essentially of about 10 to 40 wt. % of at least one Na or Ca-containing soap-based lubricant and about 60 to 90 wt. % of at least one solid particulate lubricant.

25. The welding electrode of claim 9, wherein the amount of feeding lubricant on the welding electrode is 0.01 to 1 gm/m² of wire surface area.

26. The welding electrode of claim 25, wherein the amount of feeding lubricant on the welding electrode is 0.05 to 0.5 gm/m² of wire surface area.

27. The welding electrode of claim 11, wherein the amount of feeding lubricant on the welding electrode is 0.01 to 1 gm/m² of wire surface area.

28. The welding electrode of claim 27, wherein the amount of feeding lubricant on the welding electrode is 0.05 to 0.5 gm/m² of wire surface area.

* * * * *